(12) United States Patent
Michael et al.

(10) Patent No.: US 12,010,993 B2
(45) Date of Patent: Jun. 18, 2024

(54) GRANULAR AGRICULTURAL COMPOSITIONS

(71) Applicant: OMS Investments, Inc., Los Angeles, CA (US)

(72) Inventors: Darrell Michael, Marysville, OH (US); Curtis MacDonald, Marysville, OH (US); Marcus Bertin, Plain City, OH (US); Harold E. Thompson, Powell, OH (US); Jonathon C. Raistlin Newton, Columbus, OH (US); Mark Prinster, Marysville, OH (US)

( * ) Notice: Subject to any disclaimer, the term of this patent is extended or adjusted under 35 U.S.C. 154(b) by 254 days.

(21) Appl. No.: 17/460,073

(22) Filed: Aug. 27, 2021

(65) Prior Publication Data

US 2022/0061317 A1    Mar. 3, 2022

Related U.S. Application Data

(60) Provisional application No. 63/071,972, filed on Aug. 28, 2020.

(51) Int. Cl.
| | | |
|---|---|---|
| *A01N 25/12* | (2006.01) | |
| *A01N 55/02* | (2006.01) | |
| *A01P 13/00* | (2006.01) | |
| *C05C 9/00* | (2006.01) | |
| *C05G 3/20* | (2020.01) | |
| *C05G 5/12* | (2020.01) | |

(52) U.S. Cl.
CPC ............ *A01N 25/12* (2013.01); *A01N 55/02* (2013.01); *A01P 13/00* (2021.08); *C05C 9/00* (2013.01); *C05G 3/20* (2020.02); *C05G 5/12* (2020.02)

(58) Field of Classification Search
None
See application file for complete search history.

(56) References Cited

U.S. PATENT DOCUMENTS 9,392,796 B2 *  7/2016  Thompson ............. A01N 63/38
10,822,290 B2 * 11/2020  Thompson ............. A01N 39/02

FOREIGN PATENT DOCUMENTS

CN         104478535  A  *  4/2015  ............... C05C 1/00

OTHER PUBLICATIONS

CN104478535 (Year: 2015).*

* cited by examiner

*Primary Examiner* — Alton N Pryor
(74) *Attorney, Agent, or Firm* — Frost Brown Todd LLP

(57) ABSTRACT

Granular agricultural compositions formed of a micronutrient, a granular carrier, and a nitrogen source including plant readily available nitrogen are disclosed. The granular agricultural compositions can be a granular herbicidal composition when the micronutrient is a metal chelate. The granular agricultural compositions can reduce metal chelate phytotoxicity and exhibit beneficial greening. Methods of making and using the granular agricultural compositions are further disclosed.

16 Claims, No Drawings

GRANULAR AGRICULTURAL COMPOSITIONS

CROSS-REFERENCE TO RELATED APPLICATIONS

The present application claims the priority benefit of U.S. Provisional Patent App. Ser. No. 63/071,972, filed Aug. 28, 2020, which is hereby incorporated by reference herein.

TECHNICAL FIELD

The present disclosure relates generally to granular agricultural compositions such as granular herbicidal compositions. The granular herbicidal compositions include a metal chelate and a nitrogen source including plant readily available nitrogen.

BACKGROUND

Herbicidal compositions are useful to control unwanted plant growth for various purposes including agriculture, land management, and aesthetics. Herbicidal compositions can be selective (targeting specific plants) or non-selective (killing all plant growth) and can vary widely in their mechanism of action, method of application, and their persistence. Liquid herbicides, or dry formulated herbicides that are mixed with water prior to application, are commonly used for professional weed control due to their efficient coating of plants and excellent performance. Granular herbicides are useful for their ease of application without specialized tools but suffer from various issues including the possibility of reduced efficacy due to poor herbicidal coverage on leaf tissue. Often, to overcome the shortcomings of granular herbicides, use rates of herbicidal compositions are increased to achieve similar control as liquid herbicidal compositions.

Chelated metals, and particularly chelated iron, are known to have selective weed control properties. In many jurisdictions with pesticide restrictions, chelated iron has been approved as an environmentally friendly herbicide for selective weed removal. Presently, only liquid formulations of chelated iron exist for purchase, thus limiting the potential adoption of the technology. In addition to selective weed control, iron is also a plant essential micronutrient required for plant growth. As with many plant micronutrients, the application of foliar iron is a common practice in the turfgrass industry to alleviate iron deficiencies or enhance turfgrass color. The differential uptake of high doses of iron in turfgrass compared to weeds can result in selective weed control as well as increased iron utilization in turfgrass for chlorophyll production. Many factors influence the uptake of foliar iron in plants, potentially causing a positive greening effect or a potential negative phytotoxic effect if excessive iron is absorbed

SUMMARY

According to one embodiment, a granular herbicidal composition includes a metal chelate, a granular carrier, and a nitrogen source. The nitrogen source includes plant readily available nitrogen.

According to another embodiment, a method of forming a granulated herbicidal composition includes mixing together a metal chelate, a granular carrier, and a nitrogen source to form a herbicidal composition and then granulating the herbicidal composition. The nitrogen source includes plant readily available nitrogen.

According to another embodiment, a granular micronutrient composition includes a micronutrient, a granular carrier, and a nitrogen source. The nitrogen source includes plant readily available nitrogen.

According to another embodiment, a method of forming a granulated plant micronutrient composition includes mixing together a micronutrient, a granular carrier, and a nitrogen source to form a plant nutrient composition and then granulating the plant nitrogen source to form a granulated plant micronutrient composition. The nitrogen source includes plant readily available nitrogen.

DETAILED DESCRIPTION

As can be appreciated, turfgrass management includes multiple responsibilities such as maintaining the health of the grass and control of undesirable and nuisance weed species. Traditionally, weed species are controlled, or removed through the selection of plants by, mechanical pruning, and by herbicidal application. Ideal herbicides quickly control undesirable weeds, such as broadleaf weeds, without damaging the desirable plant species.

Another aspect of proper turf management is the routine, or frequent fertilization, of the turfgrass. A properly fed stand of turf can shift the competitive balance in favor of desirable turfgrass which can result in the crowding out of weeds. Additionally, frequent fertilization can result in turf greening which can increase the aesthetic value of turf. As can be appreciated, plants can become deficient of the required nutrients and can express deficiency symptoms. To alleviate deficiency symptoms, foliar applications of the deficient nutrient can be applied to quickly correct the deficiency. Additionally, iron, a plant essential micronutrient, is often foliarly-applied, even in the absence of a deficiency to enhance the aesthetic value of turf. As can be appreciated, iron results in a quick greening response without application of nitrogen.

Known herbicides can suffer from a variety of disadvantages including safety, efficacy, ecological, and phytotoxicity issues. For example, known metal chelate herbicidal agents can exhibit efficacy and phytotoxicity issues particularly when formulated as granular herbicidal compositions.

The present disclosure generally describes granular agricultural compositions including granular herbicidal compositions and granular plant micronutrient compositions. The granular herbicidal compositions exhibit excellent herbicidal activity and selective weed control against broadleaf weeds. The granular herbicidal compositions and the granular plant micronutrient compositions both exhibit excellent flow and spreadability, and desirable turfgrass greening without excessive phytotoxicity. Generally, the granular herbicidal compositions include a metal chelate, a granular carrier, and a nitrogen source including plant readily available nitrogen while the granular plant micronutrient compositions include a micronutrient, a granular carrier, and a nitrogen source including plant readily available nitrogen. As used herein, plant readily available nitrogen refers to the definition of "readily available nitrogen" as defined by the Association of American Plant Food Control Officials ("AAPFCO"). The AAPFCO Product Guide (2016) defines "readily available nitrogen" as "water soluble nitrogen in either ammoniacal, urea, or nitrate form that does not have slow or controlled release properties".

It has been unexpectedly found that the present combination of a micronutrient or metal chelate; a granular carrier;

and a nitrogen source including plant readily available nitrogen can facilitate synergistic improvements over the use of any such component individually or in combination with similar, but, alternate components. It is theorized that when these components are suitably matched, the release of sufficient quantities of plant readily available nitrogen can accelerate a plant's ability to utilize the metal in the metal chelate and/or the micronutrient and thereby avert phytotoxicity issues including those typically associated with the elevated rates of metal chelates required for selective broadleaf weed control. Without the presence of the plant readily available nitrogen increasing the utilization rate of metal in a plant, it is believed that excess oxidation-reduction reactions caused by the metal can form free radical intermediates that can disrupt cellular function.

As can be appreciated, phytotoxicity issues can be prevalent in turfgrass when chelated metals are used for selective weed control. In particular, granular herbicidal compositions can require relatively high rates of iron to selectively control weeds particularly compared to the rates of iron required for liquid formulations for similar herbicidal coverage. In contrast to liquid formulations which can bead up and roll off the leaf surface with high volume spray rates, granular herbicidal compositions tend to accumulate on plant leaves. Such accumulation can cause dangerous levels of the metal to become bioavailable to the plants and can cause plant injury. The granular herbicidal compositions described herein can enable the plant to utilize the high levels of metal for plant growth and avoid injury.

In addition to avoiding the phytotoxicity issues observed in known granular metal chelates, the present granular agricultural compositions, when formulated with a plant essential micronutrient, such as iron, can also result in increased turf greening. In such embodiments, it is theorized that the present granular agricultural compositions can boost greening by providing the micronutrient directly to the plant leaves (e.g., providing foliar iron in certain embodiments). As can be appreciated, the plant leaves are the location where certain micronutrients, such as iron, are required in the highest concentrations. In appropriate concentrations, foliar iron can increase chlorophyll production and boost greening. For granular herbicidal compositions, the rate of iron in an iron chelate required for selective weed control is often greater than the rate required to cause a foliar greening response. Being in granular form, the granular herbicidal compositions described herein can provide substantial quantities of iron that adheres to the leaf and alleviate iron related deficiencies. In the absence of an iron deficiency, the additional foliar iron, in combination with a plant readily available nitrogen source can desirably improve turf greenness more than an application of nitrogen or iron alone at comparable rates.

As can be appreciated, liquid chelated iron herbicides are effective at controlling weeds including Florida pulsey, dollarweed, yellow woodsorrel, catsear dandelion, Canada thistle, broadleaf plantain, wild violet, and mosses. Experimental testing has confirmed that the granular agriculture compositions described herein are effective at controlling these same species particularly when sufficient morning dew is present to moisten the compositions.

Although the present disclosure refers to granular agricultural compositions, it will be appreciated that similar synergistic benefits from the combination of a metal chelate and plant readily available nitrogen source can alternatively be achieved when formulated as a liquid composition. Such embodiments are expressly contemplated herein.

Suitable metal chelates, micronutrients, granular carriers, and the nitrogen sources including plant readily available nitrogen for the granular agricultural compositions described herein can each vary in several ways. For example, suitable metal chelates can vary in the selection of both the metal and the chelate while the nitrogen source including plant readily available nitrogen can vary in compositional details such as the amount of plant readily available nitrogen and slow-release nitrogen ("SRN").

Suitable metal chelates can include coordination complexes comprising one or more transition metal cores (typically a single core) and one or more chelating agents bonded to the transition metal cores that collectively exhibit herbicidal effects. As can be appreciated, chelation can also enhance the solubility of the metal and make the metal bioavailable to plants. Both the transition metal and the chelating agents can vary widely in various embodiments. For example, suitable transition metals for forming the metal chelates can be selected from iron, copper, manganese, nickel, and zinc metals. In certain embodiments, it can be useful to select iron as the metal due to the enhanced greening effect iron can exhibit when applied to plants.

In certain embodiments, the transition metal for the metal chelate can be provided in any suitable form including as a metal salt, a metal ion, or as a metal acid. As can be appreciated however, the precise form of the transition metal is not important provided that a chelation reaction can be performed to form a metal chelate from the metal and the selected chelating agent.

Suitable chelating agents can also vary widely. For example, suitable chelating agents can include one or more of aconitic acid, alanine diacetic acid ("ADA"), alkoyl ethylene diamine triacetic acids (e.g., lauroyl ethylene diamine triacetic acids ("LED3A"), aminotri ("methylenephosphonic acid") ("ATMP"), asparticaciddiacetic acid ("ASDA), asparticacidmonoacetic acid, di amino cyclohexane tetraacetic acid ("CDTA"), citraconic acid, citric acid, 1,2-diaminopropanetetraacetic acid ("DP TA-OH"), 1,3-di amino-2-propanoltetraacetic acid ("DPTA"), diethanolamine, diethanol glycine ("DEG"), diethylenetriaminepentaacetic acid ("DTPA"), diethylene triamine pentamethylene phosphonic acid ("DTPMP"), diglycolic acid, dipicolinic acid ("DPA"), ethanolaminediacetic acid, ethanoldiglycine ("EDG"), ethionine, ethylenediamine ("EDA"), ethylenediaminediglutaric acid ("EDDG"), ethylenediaminedi ("hydroxyphenylacetic acid ("EDDHA"), ethylenediaminedipropionic acid ("EDDP"), ethylenediaminedisuccinate ("EDDS"), ethylenediaminemonosuccinic acid ("EDMS"), ethylenediaminetetraacetic acid ("EDTA"), ethylenediaminetetrapropionic acid ("EDTP"), ethyleneglycolaminoethylestertetraacetic acid ("EGTA"), gallic acid, glucoheptonic acid, gluconic acid, glutamicaciddiacetic acid ("GLDA"), glutaric acid, glyceryliminodiacetic acid, glycinamidedi succinic acid ("GADS"), glycoletherdiaminetetraacetic acid ("GEDTA"), 2-hydroxyethyldiacetic acid, hydroxyethylenediaminetriacetic acid ("HEDTA"), hydroxyethyldiphosphonic acid ("HEDP"), 2-hydroxyethyl imino diacetic acid ("HIMDA"), hydroxyiminodiacetic acid ("HIDA"), 2-hydroxy propylene diamine disuccinic acid ("HPDDS"), iminodiacetic acid ("IDA"), iminodisuccinic acid ("IDS"), itaconic acid, lauroyl ethylene diamine triacetic acids ("LED3A"), malic acid, malonic acid, methylglycinediacetate ("MGDA"), methyliminodiacetic acid ("MIDA"), monoethanolamine, nitrilotriacetic acid ("NTA"), nitrilotripropionic acid ("NPA"), N-phosphonomethyl glycine ("glyphosate"), propyldiamine tetraacetic acid ("PDTA"), salicylic acid, serinediacetic acid ("SDA"), sorbic acid, succinic acid, sugars, tartaric acid, tartronic acid, triethanolamine, triethylenetetraamine, triethylene tetraamine hexaacetic acid ("TTHA"), and combinations thereof. Additionally, or alternatively, other suitable chelating agents can include aminopolycarboxylic acid, amines, amides, amino acids, phosphonic acid and combinations thereof. Suitable amino acids can include alanine, arginine, asparagine, aspartic acid, glutamic acid, glutamine, glycine, histidine, isoleucine, leucine, lysine, methionine, proline, serine, threonine, tyrosine, valine, and combinations thereof. In certain embodiments, beet molasses, carboxylic acids and the salts thereof, salicylic acid and salts thereof, such as ammonium salicylate, citric acid, and combinations thereof can also be used as suitable chelating agents.

As can be appreciated, the chelating agents can bond with the transition metal in a chelation reaction. Generally, the chelating agents can be in any suitable form for the chelation reaction such as in a salt form (e.g., as a sodium salt, potassium salt, calcium salt, ammonium salt, amine salt, amide salt, etc.) or in other forms such as alkali metal chelates or free acids. In certain embodiments, a suitable metal chelate can be sodium ferric EDTA powder or a HEDTA salt.

The relative amounts of transition metal and chelating agent can vary widely including from substantially equal amounts of transition metal to chelating agent to substantially more or less transition metal to chelating agent. For example, the molar ratio of transition metal to chelating agent can be in the range of from about 0.05:1 to about 20:1, such as from about 0.2:1 to about 5:1 in various embodiments.

In certain embodiments, the granular agricultural compositions described herein can additionally, or alternatively, include a suitable micronutrient. For example, in certain embodiments, an iron micronutrient can be included such as ferrous sulfate monohydrate. Such compositions can be useful to enhance turfgrass greening.

In certain embodiments, the metal chelate or micronutrient can be included at about 1% to about 40% by weight of the granular agricultural composition, including ranges within about 1% to about 40% such as about 10% to about 40%, by weight, of the granular agricultural composition. For example, in certain embodiments, Fe EDTA or Fe HEDTA can be about 15% to about 30%, by weight, of the granular agricultural composition. Additional examples of metal chelates are disclosed in U.S. Pat. No. 6,972,273 B2, which is hereby incorporated herein by reference in its entirety. In certain embodiments, suitable metal chelates can also be commercially obtained.

In certain embodiments, the granular carrier for the granular agricultural compositions described herein can be formed of granular organic compounds. For example, in certain embodiments, a suitable granular carrier can be ground rice hulls or rice husks. It was previously discovered that ground rice hulls reduce the caking potential of a fertilizer component by reducing the growth potential of urea crystals. The reduction in urea crystal was also found to improve delivery of fertilizer active by diminishing the need for the urea crystals to dissolve after application thereby increasing the speed of fertilizer active delivery. Additionally, ground rice hulls can facilitate transportation and use of the granular agricultural compositions described herein due to the relatively small particle size, low bulk density, low odor threshold, and relatively high absorptivity of the rice hulls.

Generally, suitable granular carriers can be prepared by comminuting their size by grinding. For example, suitable rice hulls can be from about 20 to about 90 Size Guide Number ("SGN"), about 30 to about 60 SGN, about 45 to about 55 SGN, about 30 to about 50 SGN, about 40 to about 60 SGN, about 45 to about 50 SGN, or about 50 to about 55 SGN in various embodiments. In yet other embodiments, suitable granular carriers can be about 80 to about 85 SGN. The SGN is determined by calculating the average particle size of a product's granules in millimeters (mm) and multiplying by 100.

As can be appreciated, suitable granular carriers can also be sized in accordance to mesh size fractions. For example, suitable granular carriers, such as rice hulls, can be −20/+80 mesh size fraction rice hulls in certain embodiments. In certain embodiments, the granular carrier can be light, angular, irregular shaped particles.

In certain embodiments, the granular carrier can be about 10% to about 30% of the weight of the granular agricultural composition or any range between such values such as about 15% to about 25% by weight of the granular agricultural composition.

Generally, the nitrogen source including plant readily available nitrogen can be any compound or fertilizer that releases plant readily available nitrogen. For example, in certain embodiments, the nitrogen source including plant readily available nitrogen can be urea, a urea formaldehyde reaction product, or a combination of multiple nitrogen-containing compounds. As can be appreciated, urea formaldehyde reaction products can have advantageous nitrogen release profiles due to their combination of both plant readily available nitrogen and slow-release nitrogen compounds (e.g., methylenediurea ("MDU") and dimethylenetriurea ("DMTU")). Such embodiments can provide immediate nitrogen to plants to avert the phytotoxicity issues caused by application of a metal chelate while also continuing to release plant available nitrogen over a period of days to weeks to improve overall plant health and growth.

Suitable urea formaldehyde reaction products can be formed as known in the art (e.g., by molten processes) and can include urea-formaldehyde fertilizers and methylene urea fertilizers. In certain embodiments, suitable methylene urea fertilizers can be formed with a urea to formaldehyde ratio of about 1.5:1 to about 8:1 including ratios of about 2:1, about 3:1, about 4:1 about 5:1, about 6:1, and about 7:1. In certain embodiments, a suitable methylene urea can have a urea to formaldehyde ratio of about 4:1.

In certain embodiments, it can be useful to include the nitrogen source including plant readily available nitrogen in a ratio with the granular carrier. For example, in certain embodiments, the nitrogen source can be included in the granular agricultural composition in a weight ratio of about 2:1 to a weight ratio of about 3.5:1 including weight ratios between about 2:1 to about 3.5:1 such as weight ratios between about 2.4:1 and 3.20:1. In certain embodiments, the weight ratio of the nitrogen source including plant readily available nitrogen to the granular carrier can be about 2.9:1. A lower ratio can be useful to generate a lower total nitrogen analysis for the granular agricultural composition. As can be appreciated, a lower total nitrogen analysis means additional product can be applied by the consumer without causing injury and can allow for better application coverage. Smaller ratios also allow for the formation of smaller granules with better handling and spread.

Additional examples of both suitable nitrogen sources including plant readily available nitrogen and granular carriers are disclosed in U.S. Pat. No. 9,663,412 B2, which is hereby incorporated herein by reference in its entirety.

Generally, the granular agricultural compositions described herein can be formed by combining each of the components together to form a granular product. For example, in certain embodiments, the metal chelate or micronutrient can be formulated, or processed into, a powder and then granulated with the granular carrier. Concurrently or subsequently, the nitrogen source including plant readily available nitrogen, such as a methylene urea resin, can be combined. In certain embodiments, the granulation process can include the use of a rotating drum at temperatures of about 130° F. to about 160° F. Generally, the granular agricultural compositions described herein can be granulated to form granules having a size of about 5 SGN to about 260 SGN. As used herein, granules means a collection of particles including powders, dusts, and large solids.

In certain embodiments, the granular agricultural compositions can be granulated to any suitable size such as, for example, a US −14/+50 mesh size fraction, a −12/+50 mesh size fraction, a −10/+50 mesh size fraction, and a −10 mesh size fraction. In certain embodiments, granules can be screened to have a sieve fraction in such ranges or can be agglomerated into a particle having such size ranges. In certain embodiments, the granular agricultural compositions can be granulated to a size of about 70 SGN to about 120 SGN. As can be appreciated however, many variations and alternatives to this process are possible. For example, in certain embodiments, one or more of the components can be sprayed onto the granular carrier. Additionally, or alternatively, one or more of the components can be dissolved in a solvent or dispersed in a liquid, optionally with surfactant, and then applied in a spraying process with optional drying. In certain embodiments, a liquid sticking agent or adhesive can optionally be used to improve adhesion to the granular carrier. In yet other embodiments, the granulation process can embed, or impregnate, the components into the granular carrier.

In certain embodiments, the nitrogen source including plant readily available nitrogen can be applied in a molten state. Such embodiments are useful when the nitrogen source is a urea formaldehyde reaction product as such reaction products are typically formed using a molten process. In certain embodiments, the urea formaldehyde reaction product can be applied at a molten temperature of about 265° F. to about 270° F. with a moisture content of less than about 5%. As can be appreciated, molten nitrogen sources including plant readily available nitrogen can act as an adhesive to bind each of the components to the granular carrier.

In certain embodiments, the granular agricultural compositions described herein can include additional components such as additional nutrients. For example, the granular agricultural compositions can, in addition to nitrogen, further include the macronutrients phosphorus and potassium, secondary macronutrients such as calcium, magnesium, and sulfur, and micronutrients such as copper, iron, manganese, molybdenum, zinc, nickel, boron, silicon, and cobalt. Such additional nutrients can be included in various forms such as phosphorous pentoxide ($P_2O_5$) for phosphorus and one or more of potassium oxide ($K_2O$), potassium sulfate ($K_2SO_4$), or potassium chloride (KCl) for potassium. As can be appreciated, fertilizer compositions are typically described by their N-P-K ratio, or the percent of nitrogen, phosphorus, and potassium contained within the fertilizer. In certain embodiments, the nutrient sources added to the granular agricultural compositions described herein can have an N-P-K ratio of about 22-0-0 or about 22-0-2. In certain embodiments, the granular agricultural compositions can include about 3% to about 7%, by weight of potassium sulfate or potassium chloride. In certain embodiments, the granular agricultural compositions described herein can be entirely free of, or substantially free of, phosphorus. Additional nutrients can also be added as micro or trace elements. Examples of such elements can mono-ammonium phosphate, calcium nitrate, ammonium sulfate, isobutylidene diurea, ammonium nitrate, ureaform, anhydrous ammonia, polymer coated urea (e.g., sulfur coated urea), ammonium polyphosphate, iron, diammonium phosphate, potassium nitrate, and sodium nitrate. Such elements can be useful for both nutritional benefits (plant essential micronutrients) and/or as disease control for metals with known fungistatic properties. Micronutrients, when included, can be included at about 1 parts per million ("ppm") to about 60,000 ppm such as for example, about 10 ppm to about 20,000 ppm.

Each such additional nutrient can be added to the nitrogen source including plant readily available nitrogen or can be added independently to the granular agricultural compositions as previously described for the main components.

As can be appreciated, yet other components can be optionally added to the granular agricultural compositions. For example, one or more growth regulators such as salicylic acid or salts thereof can be included in certain embodiments. Additionally or alternatively, antioxidants, biostimulants, soil amendments, stabilizing agents, wetting agents, additional herbicides, herbicide synergists, colorants, sequestrants, and inert solid carriers can be added.

Examples of additional herbicides that can be included in the granular herbicidal compositions described herein can include, glyphosate, glufosinate, sulfonyl ureas, fatty acids, borax, copper sulfate, carboxylic acids, ammonium salts, 3,6-dichloro-2-methoxybenzoic acid ("dicamba"), and methyl chlorophenoxy propionic acid ("MCPP-P") and salts thereof. Inclusion of such additional herbicidal components can be useful to achieve herbicidal effects different than those achieved by the metal chelate alone.

Inert solid carriers can be admixed with the metal chelate, micronutrient, or the nitrogen source including plant readily available nitrogen. Suitable inert solids include organic and/or inorganic materials which absorb or can be coated with the primary components. For example, suitable inert carriers can include corncobs, peanut hulls, processed paper pulp, sawdust, limestone, gypsum, sand, vermiculite, perlite, fuller's earth and clays such as attapulgite, clays, bentonite clays, montmorillonite clays, and mixtures thereof.

In certain embodiments, it can be desirable to minimize the release of dust during formulation, or use, of the granular agricultural compositions described herein. To minimize dust, a dust suppressant or anti-caking agent can be included in certain embodiments. Generally, such dust suppressants and anti-caking agents are well known in the art. For example, in certain embodiments, commercial dust suppressants marketed as Dustrol® by ArrMaz (Mulberry, FL) can be included at about 1%, by weight, or less, of the granular fertilizer compositions. In certain embodiments, the dust suppressant or anti-caking agent can be added using a continuous or batch mixer/blender after formation of the granular agricultural composition.

Examples

To evaluate the granular agricultural compositions described herein, several example herbicidal formulations were prepared. Details of each of the formulations prepared are depicted below in Table 1. Each of Formulations 1-3 were formulated by granulating together the metal chelate; granular carrier; nitrogen source; and other nutrient sources or components, if applicable, specified in Table 1 in the depicted weight percentages. The isolated methylene urea resin product In Table 1 used as the nitrogen source for the formulations contained 66.20%, by weight, plant readily available nitrogen and 33.80%, by weight, slow-release nitrogen and was formed with a urea to formaldehyde mole ratio of 4:1. The granular agricultural compositions, when fully formulated, had 22%, by weight, total nitrogen comprised of 14.56%, by weight, plant readily available nitrogen and 7.44%, by weight, slow-release nitrogen.

backpack sprayer equipped with two TeeJet XR8002 flat fan nozzles, calibrated to deliver 0.4 gallons per minute at 40 psi. The depicted application rates for the spray applied treatments include the actual application rate after diluting with water as well as the equivalent mass of Fe HEDTA product applied during the spray process.

Approximately 24 hours after the spray applied treatments were applied, the research sites were watered-in with at least 0.25" of irrigation water. Additionally, mowing did not occur

TABLE 1

| Formulation No. | Metal Chelate (Wt. %) | Granular Carrier (Wt. %) | Nitrogen Source (Wt. %) | N—P—K (Total) | Other (Wt. %) | Plant Readily Available Nitrogen in Formulation (Wt. %) | Total Iron in Formulation (Wt. %) |
|---|---|---|---|---|---|---|---|
| 1 | 28.36% Fe EDTA | 20.29% Granulated Rice Hulls (−20/+80) | 51.35% Methylene Urea Resin Product | (22-0-0) | — | 14.56% | 3.71% |
| 2 | 24.86% Fe EDTA | 20.29% Granulated Rice Hulls (−20/+80) | 51.35% Methylene Urea Resin Product | (22-0-2) | 3.5% KCl | 14.56% | 3.25% |
| 3 | 28.07% Fe EDTA | 20.09% Granulated Rice Hulls (−20/+80) | 50.84% Methylene Urea Resin Product | (22-0-0) | 1.0% Dustrol ® 3088 | 14.56% | 3.68% |

Weed Control

Formulations 1 and 2 were evaluated to determine their weed control efficacy at various application rates. Formulations 1 and 2 were further evaluated against a comparative commercial liquid Fe HEDTA metal chelate herbicidal composition. For each trial, preceding application, mowing was withheld for 24-48 hours to ensure sufficient leaf area was present for formulation absorption. The experimental unit for weed control testing was a 3'×3' plot. Plots were separated on each side by a 2 ft. untreated buffer strip. Formulations were applied either early in the morning to dew-laden turf, or if turf was dry, after treatment plots were sprayed with water using a pump-up style handcan to simulate morning dew. Formulations were applied using a shaker jar and spreader box to ensure even particle coverage over the plot. The spray applied control was applied to dry turf the same day as the granular treatments once the turf was dry. Spray applied treatments were applied using a $CO_2$ powered until the treatments have been watered in. Each test was visually rated by comparing the weed density and relative health of weeds treated in a plot compared to the density and the health of weeds in a non-treated buffer strip immediately outside the plot to determine a weed control percentage.

Table 2 depicts the rate response of Formulations 1 and 2 to control spring common dandelions in Marysville, OH. Table 3 depicts the rate response of Formulations 1 and 2 to control early summer common dandelions. Table 4 depicts the rate response of Formulations 1 and 2 to control spring white clover. Table 5 depicts the rate response of Formulations 1 and 2 to control catsear dandelion. Table 6 depicts the rate response of Formulations 1 and 2 to control dollarweed.

TABLE 2

| | | (Spring Dandelions) | | | |
|---|---|---|---|---|---|
| Formulation | Application Rate | Weed Control Percentage 8 Days Post Application | Weed Control Percentage 16 Days Post Application | Weed Control Percentage 23 Days Post Application | Weed Control Percentage 29 Days Post Application |
| 1 | 2.046 lb/1000 ft² | 28.8% | 27.5% | 18.8% | 18.8% |
| 1 | 3.069 lb/1000 ft² | 66.3% | 46.3% | 48.8 | 41.3% |
| 1 | 4.092 lb/1000 ft² | 81.3% | 53.8% | 33.8% | 22.5% |
| 1 | 5.115 lb/1000 ft² | 87.5% | 62.5% | 52.5% | 42.5% |
| 2 | 2.046 lb/1000 ft² | 25.0% | 17.5% | 11.3% | 17.5% |
| 2 | 3.069 lb/1000 ft² | 67.5% | 25.0% | 23.8% | 25.0% |
| 2 | 4.092 lb/1000 ft² | 77.5% | 53.8% | 43.8% | 30.0% |
| 2 | 5.115 lb/1000 ft² | 82.5% | 52.5% | 40.0% | 21.3% |
| Control (Liquid Fe HEDTA) | 4.9 gal/1000 ft² (0.1 lb Fe HEDTA/ 1000 ft²) | 85.0% | 58.8% | 62.5% | 42.5% |

TABLE 3

(Early Sumer Dandelions)

| Formulation | Application Rate | Weed Control Percentage 3 Days Post Application | Weed Control Percentage 7 Days Post Application |
|---|---|---|---|
| 1 | 2.046 lb/1000 ft$^2$ | 70.0% | 45.0% |
| 1 | 3.069 lb/1000 ft$^2$ | 81.3% | 72.5% |
| 1 | 4.092 lb/1000 ft$^2$ | 90.0% | 78.8% |
| 1 | 5.115 lb/1000 ft$^2$ | 93.8% | 73.8% |
| 2 | 2.046 lb/1000 ft$^2$ | 60.0% | 23.8% |
| 2 | 3.069 lb/1000 ft$^2$ | 73.8% | 38.8% |
| 2 | 4.092 lb/1000 ft$^2$ | 82.5% | 68.8% |
| 2 | 5.115 lb/1000 ft$^2$ | 89.5% | 80.0% |
| Control (Liquid Fe HEDTA) | 4.9 gal/1000 ft$^2$ (0.1 lb Fe HEDTA/ 1000 ft$^2$) | 98.5% | 93.8% |

TABLE 4

(Spring White Clover)

| Formulation | Application Rate | Weed Control Percentage 6 Days Post Application | Weed Control Percentage 8 Days Post Application |
|---|---|---|---|
| 1 | 2.046 lb/1000 ft$^2$ | 47.5% | 21.3% |
| 1 | 3.069 lb/1000 ft$^2$ | 62.5% | 40.0% |
| 1 | 4.092 lb/1000 ft$^2$ | 65.0% | 37.5% |
| 1 | 5.115 lb/1000 ft$^2$ | 75.0% | 50.0% |
| 2 | 2.046 lb/1000 ft$^2$ | 62.5% | 40.0% |
| 2 | 3.069 lb/1000 ft$^2$ | 62.5% | 50.0% |
| 2 | 4.092 lb/1000 ft$^2$ | 76.3% | 46.3% |
| 2 | 5.115 lb/1000 ft$^2$ | 60.0% | 51.3% |
| Control (Liquid Fe HEDTA) | 4.9 gal/1000 ft$^2$ (0.1 lb Fe HEDTA/ 1000 ft$^2$) | 78.8% | 43.8% |

TABLE 5

(Catsear Dandelion)

| Formulation | Application Rate | Weed Control Percentage 7 Days Post Application | Weed Control Percentage 14 Days Post Application |
|---|---|---|---|
| 1 | 2.046 lb/1000 ft$^2$ | 75.0% | 72.5% |
| 1 | 3.069 lb/1000 ft$^2$ | 85.0% | 80.0% |
| 1 | 4.092 lb/1000 ft$^2$ | 83.8% | 76.3% |
| 1 | 5.115 lb/1000 ft$^2$ | 90.0% | 82.5% |
| 2 | 2.046 lb/1000 ft$^2$ | 67.5% | 50.0% |
| 2 | 3.069 lb/1000 ft$^2$ | 75.0% | 72.5% |
| 2 | 4.092 lb/1000 ft$^2$ | 81.3% | 70.0% |
| 2 | 5.115 lb/1000 ft$^2$ | 87.5% | 82.5% |
| Control (Liquid Fe HEDTA) | 4.9 gal/1000 ft$^2$ (0.1 lb Fe HEDTA/ 1000 ft$^2$) | 93.8% | 87.5% |

TABLE 6

(Dollarweed)

| Formulation | Application Rate | Weed Control Percentage 2 Days Post Application | Weed Control Percentage 3 Days Post Application | Weed Control Percentage 8 Days Post Application |
|---|---|---|---|---|
| 1 | 2.046 lb/1000 ft$^2$ | 20.0% | 35.0% | 8.0% |
| 1 | 3.069 lb/1000 ft$^2$ | 37.5% | 50.0% | 40.0% |
| 1 | 4.092 lb/1000 ft$^2$ | 37.5% | 70.0% | 40.0% |
| 1 | 5.115 lb/1000 ft$^2$ | 67.5% | 80.0% | 38.0% |
| 2 | 2.046 lb/1000 ft$^2$ | 30.0% | 42.4% | 18.0% |
| 2 | 3.069 lb/1000 ft$^2$ | 42.5% | 52.5% | 40.0% |
| 2 | 4.092 lb/1000 ft$^2$ | 32.5% | 57.5% | 48.0% |
| 2 | 5.115 lb/1000 ft$^2$ | 52.5% | 72.5% | 38.0% |
| Control (Liquid Fe HEDTA) | 4.9 gal/1000 ft$^2$ (0.1 lb Fe HEDTA/ 1000 ft$^2$) | 70.0% | 85.0% | 63.0% |

As depicted by Tables 2 to 6, both Formulations 1 and 2 demonstrated effective control of weeds at an application rate of 4.092 lb/1000 ft$^2$. Formulations 1 and 2 were similar to the liquid Fe HEDTA herbicidal composition despite being applied as a granular product. Herbicidal activity on dollarweed was high, however vertical leaf orientation of much of the dollarweed population made it difficult for the dollarweed to intercept the granular formulations which had particles falling straight downward during the application, thus limiting peak efficacy. Modified testing methodologies may improve dollarweed efficacy.

Dust Suppressant

Formulation 3 was prepared to evaluate whether inclusion of a common dust suppressant, used in the manufacturing process, Dustrol® 3088 impacted the performance of the granular herbicidal compositions. Dustrol® 3088 is a commercially available dust suppressant for fertilizer applications manufactured by Arr-Maz Custom Chemicals, Inc. (Mulberry, FL). Tables 7 and 8 evaluate the difference in performance between Formulation 1 (free of a dust suppressant) and Formulation 3 (including Dustrol® 3088) to control dandelions and white clover respectively.

TABLE 7

(Dandelion)

| Formulation | Application Rate | Weed Control Percentage 3 Days Post Application | Weed Control Percentage 6 Days Post Application | Weed Control Percentage 10 Days Post Application | Weed Control Percentage 17 Days Post Application |
|---|---|---|---|---|---|
| 1 | 4.092 lb/1000 ft$^2$ | 92.2% | 94.0% | 78.0% | 40.0% |
| 3 | 4.092 lb/1000 ft$^2$ | 93.8% | 95.4% | 80.0% | 48.0% |

TABLE 7-continued (Dandelion)

| Formulation | Application Rate | Weed Control Percentage 3 Days Post Application | Weed Control Percentage 6 Days Post Application | Weed Control Percentage 10 Days Post Application | Weed Control Percentage 17 Days Post Application |
|---|---|---|---|---|---|
| Control (Liquid Fe HEDTA) | 4.9 gal/1000 ft$^2$ (0.1 lb Fe HEDTA/ 1000 ft$^2$) | 98.6% | 97.8% | 72.0% | 36.0% |

TABLE 8

(White Clover)

| Formulation | Application Rate | Weed Control Percentage 3 Days Post Application | Weed Control Percentage 4 Days Post Application | Weed Control Percentage 6 Days Post Application | Weed Control Percentage 10 Days Post Application | Weed Control Percentage 17 Days Post Application |
|---|---|---|---|---|---|---|
| 1 | 4.092 lb/1000 ft$^2$ | 46.0% | 58.0% | 49.0% | 54.0% | 44.0% |
| 3 | 4.092 lb/1000 ft$^2$ | 44.0% | 60.0% | 50.0% | 50.0% | 34.0% |
| Control (Liquid Fe HEDTA) | 4.9 gal/1000 ft$^2$ (0.1 lb Fe HEDTA/ 1000 ft$^2$) | 68.0% | 69.0% | 55.0% | 56% | 42.0% |

As depicted by Tables 7 and 8, Formulations 1 and 3 were statistically similar in performance despite the addition of a dust suppressant on most rating dates. On common dandelion, the addition of Dustrol® 3088 (Formulation 3) provided a slight increase in efficacy over Formulation 1 (without Dustrol®). No difference between Formulations 1 and 3 were observed on trials with White Clover indicating that Dustrol® 3088 had no impact on granular efficacy.

Reapplication Interval

Tables 9 and 10 evaluate the effects of reapplying the granular herbicidal compositions for control of persistent weeds or to correct for non-optimal application timing of the composition. Tables 8 and 9 evaluate application of Formulation 1 at reapplication intervals of 2 weeks, 3 weeks, and 4 weeks on dandelion and white clover. Tables 9 and 10 further include a commercial liquid Fe HEDTA applied at the recommended reapplication timing interval as well as a conventional, commercial herbicide standard (Scotts® Turf Builder® Weed and Feed available from the Scotts Company LLC (Marysville, OH) as a comparative control).

TABLE 9

(Dandelion)

| Formulation | Application Rate | Weed Control Percentage (5 days after initial application) | Weed Control Percentage (14 days after initial application) | Weed Control Percentage (18 days after initial application) | Weed Control Percentage (25 days after initial application) | Weed Control Percentage (32 days after initial application) |
|---|---|---|---|---|---|---|
| 1 (2 week reapplication) | 4.092 lb/1000 ft$^2$ | 88.8% | 76.3% | 97.5% | 87.0% | 90.0% |
| 1 (3 week reapplication) | 4.092 lb/1000 ft$^2$ | 88.8% | 76.3% | 40.0% | 99.3% | 99.0% |
| 1 (4 week reapplication) | 4.092 lb/1000 ft$^2$ | 90.0% | 68.8% | 32.5% | 40.0% | 97.8% |
| Liquid Fe HEDTA (3 week reapplication) | 4.9 gal/1000 ft$^2$ (0.1 lb Fe HEDTA/ 1000 ft$^2$) | 95.3% | 73.8% | 27.5% | 100% | 99.3% |
| Commercial Herbicide | 2.86 lb/1000 ft$^2$ | 2.5% | 48.8% | 35.0% | 67.5% | 88.8% |

TABLE 10

(White Clover)

| Formulation | Application Rate | Weed Control Percentage (5 days after initial application) | Weed Control Percentage (14 days after initial application) | Weed Control Percentage (18 days after initial application) | Weed Control Percentage (25 days after initial application) | Weed Control Percentage (32 days after initial application) |
|---|---|---|---|---|---|---|
| 1 (2 week reapplication) | 4.092 lb/1000 ft$^2$ | 47.5% | 50.0% | 70.0% | 80.0% | 65.0% |
| 1 (3 week reapplication) | 4.092 lb/1000 ft$^2$ | 57.5% | 45.0% | 15.0% | 87.5% | 77.5% |
| 1 (4 week reapplication) | 4.092 lb/1000 ft$^2$ | 47.5% | 53.8% | 27.5% | 35.0% | 88.8% |
| Liquid Fe HEDTA (3 week reapplication) | 4.9 gal/1000 ft$^2$ (0.1 lb Fe HEDTA/1000 ft$^2$) | 47.5% | 42.5% | 15.0% | 88.8% | 86.3% |
| Commercial Herbicide | 2.86 lb/1000 ft$^2$ | 55.0% | 83.8% | 86.3% | 76.3% | 88.8% |

As depicted by tables 9 and 10, all formulations, with the exception of the commercial herbicide, provided similar results with weed recovery occurring with an increase in time from initial application. Reapplication, regardless of the time period, restored control over the weed and control from multiple applications lasted longer than a single application.

Phytotoxicity of Comparative Formulations

To better understand the phytotoxicity of metal chelates, several comparative formulations were evaluated. Six trials were conducted to evaluate the safety of an experimental granular Fe EDTA formulation to a commercially available liquid Fe HEDTA formulation on northern turfgrass species. Two species, Kentucky bluegrass and tall fescue were evaluated at two different application timings (summer and fall). Perennial ryegrass and fine fescue were both evaluated in the fall only. The research trials were conducted at the *Scotts Miracle Gro* research facility in Marysville, OH. For each trial, preceding application, mowing was withheld for 24-48 hours to ensure sufficient leaf area was present for formulation absorption. The experimental unit for turfgrass phytotoxicity testing was a 3'×3' plot. The research area for turfgrass phytotoxicity contained minimal weed pressure so that product impact could be accurately and consistently assessed. Plots were separated on each side by a 2 ft. untreated buffer strip. Formulations were applied either early in the morning to dew-laden turf, or if turf was dry, after treatment plots were sprayed with water using a pump-up style handcan to simulate morning dew. Formulations were applied using a shaker jar and spreader box to ensure even particle coverage over the plot. The spray applied control was applied to dry turf the same day as the granular treatments once the turf was dry. Spray applied treatments were applied using a CO2 powered backpack sprayer equipped with two TeeJet XR8002 flat fan nozzles, calibrated to deliver 0.4 gallons per minute at 40 psi. Approximately 48 hours after the spray applied treatments were applied, the research sites were watered-in with at least 0.25" of irrigation water. Additionally, mowing did not occur until the treatments had been irrigated. The application process was repeated for the iron-based treatments three weeks after the initial application. Phytotoxicity was visually estimated on a 0-100% scale, evaluating the treatment induced effects on turf color, uniformity, health, and overall vigor. This is common practice in the trade to evaluate the safety of herbicidal compositions on turfgrass.

The experimental granular product was Fe EDTA granulated with canola meal. Canola meal is considered a slow release nitrogen source. Tables 11 and 12 list the application rates of each of the comparative formulations in summer and fall respectively.

TABLE 11

(Comparative Application Rates for Summer Phytotoxicity Testing)

| Comparative Formulation | Formulation Application Rate | Pounds Iron/ 1000 ft$^2$ | Pounds Nitrogen/1000 ft$^2$ |
|---|---|---|---|
| 1× High Rate Granular Fe EDTA | 22.53 lb/1000 ft$^2$ | 0.21 | 1.12 |
| 2× High Rate Granular Fe EDTA | 45.1 lb/1000 ft$^2$ | 0.42 | 2.24 |
| 4× High Rate Granular Fe EDTA | 90.1 lb/1000 ft$^2$ | 0.84 | 4.5 |
| 1× High Rate Liquid Fe HEDTA | 4.9 gal/1000 ft$^2$ | 0.2 | — |
| 2× High Rate Liquid Fe HEDTA | 9.8 gal/1000 ft$^2$ | 0.4 | — |
| 4× High Rate Liquid Fe HEDTA | 19.6 gal/1000 ft$^2$ | 0.8 | — |

TABLE 12

(Comparative Application Rates for Fall Phytotoxicity Testing)

| Comparative Formulation | Formulation Application Rate | Pounds Iron/ 1000 ft$^2$ | Pounds Nitrogen/1000 ft$^2$ |
|---|---|---|---|
| 1× Medium Rate Granular Fe EDTA | 16.39 lb/1000 ft$^2$ | 0.15 | 0.82 |
| 2× Medium Rate Granular Fe EDTA | 32.78 lb/1000 ft$^2$ | 0.30 | 1.6 |
| 4× Medium Rate Granular Fe EDTA | 65.56 lb/1000 ft$^2$ | 0.60 | 3.3 |
| 4× High Rate Granular Fe EDTA | 90.12 lb/1000 ft$^2$ | 0.82 | 4.5 |
| 1× Medium Rate Liquid Fe HEDTA | 4.9 gal/1000 ft$^2$ | 0.1 | — |
| 2× Medium Rate Liquid Fe HEDTA | 9.8 gal/1000 ft$^2$ | 0.2 | — |
| 4× Medium Rate Liquid Fe HEDTA | 19.6 gal/1000 ft$^2$ | 0.4 | — |
| 4× High Rate Liquid Fe HEDTA | 39.2 gal/1000 ft$^2$ | 0.8 | — |

Tables 13 and 14 depicts the results of summer phytotoxicity testing of Kentucky bluegrass and tall fescue respectively. The comparative formulations were applied in June to natural dew at an air temperature of 67° F. Liquid treatments were applied after the natural dew had completely dried off. Phytotoxicity was not observed for untreated controls.

TABLE 13

(Summer Phytotoxicity of Kentucky Bluegrass)

| Comparative Formulation | Phytotoxicity (%) Days After Initial Application/Days After Second Application | | | | | | | | | |
|---|---|---|---|---|---|---|---|---|---|---|
| | 3/0 | 6/0 | 10/0 | 19/0 | 26/2 | 31/7 | 35/11 | 38/14 | 42/18 | 56/32 |
| 1× High Rate Granular Fe EDTA | 26.3 | 6.5 | 10 | 1.3 | 6.3 | 0 | 0 | 0 | 0 | 0 |
| 2× High Rate Granular Fe EDTA | 51.3 | 22.5 | 12.5 | 0 | 27.5 | 13.8 | 8.8 | 3.8 | 2.5 | 0 |
| 4× High Rate Granular Fe EDTA | 76.3 | 45 | 36.3 | 3.8 | 88.3 | 78.8 | 70 | 58.5 | 52.5 | 15 |
| 1× High Rate Liquid Fe HEDTA | 7.5 | 12.5 | 10 | 0.5 | 6.3 | 1.3 | 0 | 0 | 0 | 0 |
| 2× High Rate Liquid Fe HEDTA | 8.8 | 20 | 18.8 | 0 | 7.5 | 0 | 0 | 0 | 0 | 0 |
| 4× High Rate Liquid Fe HEDTA | 20 | 22.5 | 30 | 0 | 11.3 | 1.3 | 0 | 0 | 0 | 0 |

TABLE 14

(Summer Phytotoxicity of Tall Fescue)

| Comparative Formulation | Phytotoxicity (%) Days After Initial Application/Days After Second Application | | | | | | | | | |
|---|---|---|---|---|---|---|---|---|---|---|
| | 3/0 | 6/0 | 10/0 | 19/0 | 26/2 | 31/7 | 35/11 | 38/14 | 42/18 | 56/32 |
| 1× Granular Fe EDTA | 47.5 | 13.8 | 7.5 | 0 | 32.5 | 10 | 5 | 3.8 | 1.3 | 0 |
| 2× Granular Fe EDTA | 68.8 | 20 | 12.5 | 0 | 42.5 | 22.5 | 16.3 | 13.8 | 6.3 | 0 |
| 4× Granular Fe EDTA | 83.8 | 35 | 21.3 | 0 | 78.8 | 78.8 | 76.3 | 66.3 | 63.8 | 20 |
| 1× Liquid Fe HEDTA | 11.3 | 17.5 | 10 | 0 | 35 | 7.5 | 8.8 | 2.5 | 1.3 | 0 |
| 2× Liquid Fe HEDTA | 21.3 | 27.5 | 16.3 | 1.3 | 45 | 10 | 10 | 6.3 | 1.3 | 0 |
| 4× Liquid Fe HEDTA | 27.5 | 37.5 | 22.5 | 2.5 | 55 | 20 | 13.8 | 8.8 | 6.3 | 2.5 |

Tables 15 to 18 depicts the results of fall phytotoxicity testing of Kentucky bluegrass, perennial ryegrass, fine fescue, and tall fescue respectively. The granular comparative formulations were applied in October at an air temperature of 43° F. and a relative humidity of 100%. Liquid treatments were applied after the natural dew had completely dried off

TABLE 15

(Fall Phytotoxicity of Kentucky Bluegrass)

| Comparative Formulation | Phytotoxicity (%) Days After Initial Application/ Days After Second Application | | | | | | | |
|---|---|---|---|---|---|---|---|---|
| | 2/0 | 6/0 | 9/0 | 14/0 | 22/1 | 27/6 | 42/21 | 90/69 |
| 1× High Rate Granular Fe EDTA | 12.5 | 5 | 2.5 | 0 | 0 | 0 | 0 | 0 |
| 2× High Rate Granular Fe EDTA | 20 | 5 | 5 | 0 | 0 | 2.5 | 0 | 0 |
| 4× High Rate Granular Fe EDTA | 41.3 | 21.3 | 10 | 5 | 8.8 | 9.3 | 3.8 | 0 |
| 4× High Rate Granular Fe EDTA | 55 | 20 | 15 | 3 | 5 | 3 | 1.3 | 0 |
| 1× High Rate Liquid Fe HEDTA | 5 | 2.5 | 1.3 | 0 | 0 | 1.3 | 0 | 0 |
| 2× High Rate Liquid Fe HEDTA | 16.3 | 10 | 3.8 | 3.8 | 10 | 7.5 | 3 | 0 |
| 4× High Rate Liquid Fe HEDTA | 23.8 | 7.5 | 6.3 | 3.8 | 6.3 | 4.3 | 1.3 | 0 |

TABLE 15-continued (Fall Phytotoxicity of Kentucky Bluegrass)

| Comparative Formulation | Phytotoxicity (%) Days After Initial Application/ Days After Second Application | | | | | | | |
|---|---|---|---|---|---|---|---|---|
| | 2/0 | 6/0 | 9/0 | 14/0 | 22/1 | 27/6 | 42/21 | 90/69 |
| 4× High Rate Liquid Fe HEDTA | 17.5 | 5 | 7.5 | 1.3 | 0 | 1.3 | 0 | 0 |

TABLE 16

(Fall Phytotoxicity of Perennial Ryegrass)

| Comparative Formulation | Phytotoxicity (%) Days After Initial Application/ Days After Second Application | | | | | | | |
|---|---|---|---|---|---|---|---|---|
| | 2/0 | 6/0 | 9/0 | 14/0 | 22/1 | 27/6 | 42/21 | 90/69 |
| 1× Medium Rate Granular Fe EDTA | 11.3 | 5 | 7.5 | 2.5 | 2.5 | 3.8 | 0 | 0 |
| 2× Medium Rate Granular Fe EDTA | 25 | 18.8 | 7.5 | 5 | 2.5 | 3.8 | 0 | 0 |
| 4× Medium Rate Granular Fe EDTA | 55 | 36.3 | 20 | 6.3 | 6.3 | 5.5 | 0 | 0 |
| 4× High Rate Granular Fe EDTA | 60 | 37.5 | 17.5 | 15 | 7.5 | 3.8 | 0 | 0 |
| 1× Medium Rate Liquid Fe HEDTA | 7.5 | 1.3 | 0 | 1.3 | 0 | 0 | 0 | 0 |
| 2× Medium Rate Liquid Fe HEDTA | 13.8 | 3.8 | 2.5 | 2.5 | 2.5 | 1.3 | 0 | 0 |
| 4× Medium Rate Liquid Fe HEDTA | 12.5 | 6.3 | 2.5 | 0 | 3.8 | 1.3 | 0 | 0 |
| 4× High Rate Liquid Fe HEDTA | 22.5 | 11.3 | 1.3 | 0 | 0 | 0 | 0 | 0 |

TABLE 17

(Fall Phytotoxicity of Fine Fescue)

| Comparative Formulation | Phytotoxicity (%) Days After Initial Application/ Days After Second Application | | | | | | | |
|---|---|---|---|---|---|---|---|---|
| | 2/0 | 6/0 | 9/0 | 14/0 | 22/1 | 27/6 | 42/21 | 90/69 |
| 1× Medium Rate Granular Fe EDTA | 10 | 6.3 | 3.8 | 10 | 8.8 | 6.3 | 1 | 0 |
| 2× Medium Rate Granular Fe EDTA | 25 | 17.5 | 10 | 8.8 | 13.8 | 12.5 | 3.8 | 0 |
| 4× Medium Rate Granular Fe EDTA | 37.5 | 35 | 16.3 | 27.5 | 31.8 | 25 | 5.5 | 0 |
| 4× High Rate Granular Fe EDTA | 47.5 | 40 | 33.8 | 46.3 | 38.8 | 37.5 | 9.3 | 0 |
| 1× Medium Rate Liquid Fe HEDTA | 3.8 | 3.8 | 2.5 | 0 | 5 | 1.3 | 0 | 0 |
| 2× Medium Rate Liquid Fe HEDTA | 5 | 0 | 0 | 0 | 0 | 1.3 | 0 | 0 |
| 4× Medium Rate Liquid Fe HEDTA | 12.5 | 2.5 | 1.3 | 2.5 | 7.5 | 5 | 0.5 | 0 |
| 4× High Rate Liquid Fe HEDTA | 17.5 | 2.5 | 1.3 | 2.5 | 0 | 0 | 0 | 0 |

TABLE 18

(Fall Phytotoxicity of Tall Fescue)

| Comparative Formulation | Phytotoxicity (%) Days After Initial Application/ Days After Second Application | | | | | | | |
|---|---|---|---|---|---|---|---|---|
| | 2/0 | 6/0 | 9/0 | 14/0 | 22/1 | 27/6 | 42/21 | 90/69 |
| 1× Medium Rate Granular Fe EDTA | 15 | 27.5 | 10 | 13.8 | 18.8 | 1.3 | 0 | 0 |
| 2× Medium Rate Granular Fe EDTA | 20 | 28.8 | 22.5 | 28. | 21.3 | 11.3 | 5 | 0 |
| 4× Medium Rate Granular Fe EDTA | 38.8 | 62.5 | 36.3 | 58.8 | 30 | 15 | 6.3 | 0 |
| 4× High Rate Granular Fe EDTA | 42.5 | 55 | 40 | 53.8 | 28.8 | 17.5 | 8.8 | 0 |
| 1× Medium Rate Liquid Fe HEDTA | 18.8 | 21.3 | 10 | 10 | 15 | 2.5 | 0 | 0 |
| 2× Medium Rate Liquid Fe HEDTA | 25 | 36.3 | 20 | 18.8 | 27.5 | 7.5 | 2.5 | 0 |
| 4× Medium Rate Liquid Fe HEDTA | 46.3 | 31.3 | 17.5 | 18.8 | 17.5 | 7.5 | 2.5 | 0 |
| 4× High Rate Liquid Fe HEDTA | 16.3 | 17.5 | 10 | 10 | 7.5 | 1.3 | 0 | 0 |

As depicted in Tables 12 to 17, several phytotoxicity trends were observed for the comparative formulations including higher rates of phytotoxicity in summer (Tables 12 and 13) than fall (Tables 14 to 17). It is believed that there is a higher uptake of iron in the summer months compared to the fall months leading to increased rates of phytotoxicity. Granular Fe EDTA also exhibited higher rates of phytotoxicity than liquid Fe HEDTA in most instances. It is theorized that the granular product was capable of building up on leaf surfaces while the liquid products reached a saturation point preventing further damage.

Phytotoxicity of Granular Herbicidal Compositions

Tables 20 to 23 compare the phytotoxicity of the comparative granular and liquid Fe HEDTA compositions of Tables 13 to 18 against inventive Formulation 1. Table 19 depicts the application rates of each of comparative and inventive formulations.

TABLE 19

(Application Rates for Summer Phytotoxicity Testing)

| Comparative Formulation | Formulation Application Rate | Pounds Iron/ 1000 ft² | Pounds Nitrogen/1000 ft² |
|---|---|---|---|
| 1× Formulation 1 | 4.092 lb/1000 ft² | 0.152 | 0.9 |
| 2× Formulation 1 | 8.18 lb/1000 ft² | 0.304 | 1.8 |
| 4× Formulation 1 | 16.37 lb/1000 ft² | 0.608 | 3.6 |
| 1× Medium Rate Granular Fe EDTA | 16.39 lb/1000 ft² | 0.15 | 0.82 |
| 2× Medium Rate Granular Fe EDTA | 32.78 lb/1000 ft² | 0.30 | 1.6 |
| 4× Medium Rate Granular Fe EDTA | 65.56 lb/1000 ft² | 0.6 | 3.3 |
| 1× Medium Rate Liquid Fe HEDTA | 4.9 gal/m² | 0.1 | — |
| 2× Medium Rate Liquid Fe HEDTA | 9.8 gal/m² | 0.2 | — |
| 4× Medium Rate Liquid Fe HEDTA | 19.6 gal/m² | 0.4 | — |

Table 20 evaluates summer phytotoxicity of Kentucky bluegrass, Table 20 evaluates tall fescue, Table 21 perennial ryegrass, and Table 22 fine fescue.

TABLE 20

(Summer Phytotoxicity of Kentucky Bluegrass)

| | Phytotoxicity (%) Days After Initial Application | | | |
|---|---|---|---|---|
| Formulation | 5 | 7 | 12 | 19 |
| 1× Formulation 1 | 2.5 | 1.3 | 0.0 | 0.0 |
| 2× Formulation 1 | 2.5 | 1.3 | 0.0 | 0.0 |
| 4× Formulation 1 | 8.0 | 6.3 | 0.0 | 0.0 |
| 1× Medium Rate Granular Fe EDTA | 20.0 | 11.3 | 2.5 | 0.0 |
| 2× Medium Rate Granular Fe EDTA | 33.8 | 33.8 | 11.8 | 7.5 |
| 4× Medium Rate Granular Fe EDTA | 51.3 | 50.0 | 23.8 | 5.0 |
| 1× Medium Rate Liquid Fe HEDTA | 8.8 | 5.0 | 0.5 | 0.0 |
| 2× Medium Rate Liquid Fe HEDTA | 11.3 | 7.5 | 0.0 | 1.3 |
| 4× Medium Rate Liquid Fe HEDTA | 11.3 | 16.3 | 0.0 | 2.5 |

TABLE 21

(Summer Phytotoxicity of Tall Fescue)

| | Phytotoxicity (%) Days After Initial Application | | | |
|---|---|---|---|---|
| Formulation | 5 | 7 | 12 | 19 |
| 1× Formulation 1 | 7.5 | 3.5 | 0.0 | 0.0 |
| 2× Formulation 1 | 18.8 | 3.8 | 0.8 | 0.0 |
| 4× Formulation 1 | 26.3 | 13.0 | 2.0 | 0.0 |
| 1× Medium Rate Granular Fe EDTA | 36.3 | 31.3 | 6.8 | 0.0 |
| 2× Medium Rate Granular Fe EDTA | 48.8 | 31.3 | 12.0 | 5.0 |
| 4× Medium Rate Granular Fe EDTA | 63.9 | 58.8 | 20.0 | 7.5 |
| 1× Medium Rate Liquid Fe HEDTA | 27.5 | 20.0 | 3.8 | 0.0 |
| 2× Medium Rate Liquid Fe HEDTA | 25.0 | 28.8 | 3.8 | 0.8 |
| 4× Medium Rate Liquid Fe HEDTA | 37.5 | 18.8 | 10.0 | 5.0 |

TABLE 22

(Summer Phytotoxicity of Perennial Ryegrass)

| | Phytotoxicity (%) Days After Initial Application | | | |
|---|---|---|---|---|
| Formulation | 5 | 7 | 12 | 19 |
| 2× Formulation 1 | 0.0 | 0.0 | 0.0 | 0.0 |
| 4× Formulation 1 | 1.8 | 1.3 | 0.0 | 0.0 |
| 2× Medium Rate Granular Fe EDTA | 21.8 | 23.8 | 10.0 | 0.0 |
| 4× Medium Rate Granular Fe EDTA | 57.5 | 78.8 | 22.5 | 2.5 |
| 4× Medium Rate Liquid Fe HEDTA | 48.8 | 35.0 | 12.5 | 1.3 |

TABLE 23

(Summer Phytotoxicity of Fine Fescue)

| | Phytotoxicity (%) Days After Initial Application | | | |
|---|---|---|---|---|
| Formulation | 5 | 7 | 12 | 19 |
| 2× Formulation 1 | 3.8 | 1.3 | 0.0 | 0.0 |
| 4× Formulation 1 | 6.3 | 1.3 | 0.0 | 0.0 |
| 2× Medium Rate Granular Fe EDTA | 27.5 | 27.5 | 8.0 | 8.8 |
| 4× Medium Rate Granular Fe EDTA | 55.0 | 63.8 | 22.5 | 17.5 |
| 4× Medium Rate Liquid Fe HEDTA | 7.5 | 2.5 | 0.0 | 0.0 |

As illustrated by Tables 20 to 23, Formulation 1 exhibits substantially less phytotoxicity than the comparative granular Fe EDTA despite both having similar concentrations of iron. Additionally, Formulation 1 exhibited less phytotoxicity than the liquid Fe HEDTA product despite the granular product sticking to leaves and increasing the amount of available iron while the liquid Fe HEDTA product dripped off the leaves lowering the amount of available iron. It is theorized that the decrease in phytotoxicity is due to the presence of plant readily available nitrogen in Formulation 1 which allows the plants to utilize a greater amount of iron without being damaged.

To further evaluate the phytotoxicity, additional tests were performed using a single application of the formulations as well as different grasses, application rates, and also a commercial turf product, Turf Builder® Weed and Feed, available from the Scotts Company LLC (Marysville, OH) (hereinafter, "Turf Builder® W&F"). Turf Builder® W&F has an N-P-K ratio of 28-0-3. Table 24 depicts the application rates for the additional phytotoxicity testing.

TABLE 24

(Application Rates for Additional Summer Phytotoxicity Testing)

| Comparative Formulation | Formulation Application Rate |
|---|---|
| 1× Formulation 1 | 4.092 lb/1000 ft² |
| 2× Formulation 1 | 8.18 lb/1000 ft² |
| 4× Formulation 1 | 16.37 lb/1000 ft² |
| 2× Liquid Fe HEDTA | 9.8 gal/1000 ft² |
| 4× Liquid Fe HEDTA | 19.6 gal/1000 ft² |
| 2× Turf Builder® W&F | 5.72 lb/1000 ft² |
| 4× Turf Builder® W&F | 11.44 lb/1000 ft² |

Tables 25 to 28 depict the results of spring and summer phytotoxicity testing of bermudagrass (80% green-up), buffalograss (100% green up), perennial ryegrass, and zoysiagrass at 50% transition respectively. The formulations were applied to natural dew, and the liquid HEDTA was spray applied using a $CO_2$ powered backpack sprayer configured to spray 0.4 gallons of solution per 60 seconds. Phytotoxicity was not observed for untreated controls.

TABLE 25

(April Phytotoxicity of Bermudagrass)

| Formulation | Phytotoxicity (%) Days After Initial Application | | | | | | |
|---|---|---|---|---|---|---|---|
| | 1 | 3 | 7 | 14 | 21 | 29 | 35 |
| 1× Formulation 1 | 10 | 8 | 0 | 0 | 0 | 0 | 0 |
| 2× Formulation 1 | 8 | 8 | 0 | 0 | 0 | 0 | 0 |
| 4× Formulation 1 | 30 | 23 | 8 | 0 | 0 | 0 | 0 |
| 2× Liquid Fe HEDTA | 33 | 23 | 8 | 0 | 3 | 0 | 0 |
| 4× Liquid Fe HEDTA | 38 | 40 | 15 | 15 | 10 | 0 | 0 |
| 2× Turf Builder ® W&F | 0 | 0 | 0 | 0 | 0 | 0 | 0 |
| 4× Turf Builder ® W&F | 0 | 0 | 8 | 0 | 0 | 0 | 0 |

TABLE 26

(June Phytotoxicity of Buffalograss)

| Formulation | Phytotoxicity (%) Days After Initial Application | | | | | | |
|---|---|---|---|---|---|---|---|
| | 1 | 2 | 8 | 14 | 21 | 36 | 47 |
| 1× Formulation 1 | 0 | 0 | 0 | 0 | 0 | 0 | 0 |
| 2× Formulation 1 | 0 | 0 | 0 | 0 | 0 | 0 | 0 |
| 4× Formulation 1 | 0 | 0 | 0 | 0 | 0 | 0 | 0 |
| 2× Liquid Fe HEDTA | 0 | 5 | 0 | 0 | 0 | 0 | 0 |
| 4× Liquid Fe HEDTA | 0 | 11.3 | 1.3 | 0 | 0 | 0 | 0 |
| 2× Turf Builder ® W&F | 0 | 0 | 7.5 | 7.5 | 7.5 | 0 | 0 |
| 4× Turf Builder ® W&F | 0 | 0 | 12.5 | 22.5 | 27.5 | 5 | 0 |

TABLE 27

(August Phytotoxicity of Perennial Ryegrass)

| Formulation | Phytotoxicity (%) Days After Initial Application | | | | |
|---|---|---|---|---|---|
| | 1 | 3 | 7 | 15 | 22 |
| 1× Formulation 1 | 0 | 0 | 0 | 0 | 0 |
| 2× Formulation 1 | 0 | 0 | 0 | 0 | 0 |
| 4× Formulation 1 | 0 | 1.3 | 1.3 | 0 | 0 |
| 2× Liquid Fe HEDTA | 11.3 | 6.3 | 3.8 | 2.5 | 0 |
| 4× Liquid Fe HEDTA | 8.8 | 10 | 3.8 | 0 | 0 |
| 2× Turf Builder ® W&F | 0 | 0 | 0 | 0 | 0 |
| 4× Turf Builder ® W&F | 0 | 1.3 | 0 | 0 | 0 |

TABLE 28

(May Phytotoxicity of Perennial Ryegrass)

| Formulation | Phytotoxicity (%) Days After Initial Application | | | | |
|---|---|---|---|---|---|
| | 1 | 5 | 11 | 14 | 21 |
| 1× Formulation 1 | 6.3 | 3.8 | 1.3 | 0 | 0 |
| 2× Formulation 1 | 8.8 | 11.3 | 6.3 | 1.8 | 0 |
| 4× Formulation 1 | 15.0 | 13.8 | 10.0 | 0.8 | 0 |
| 2× Liquid Fe HEDTA | 25.0 | 18.8 | 8.8 | 7.5 | 1.3 |
| 4× Liquid Fe HEDTA | 33.8 | 23.8 | 16.3 | 7.5 | 0 |
| 2× Turf Builder ® W&F | 0 | 1.3 | 1.3 | 0 | 5 |
| 4× Turf Builder ® W&F | 0 | 3.8 | 10.0 | 5.0 | 0 |

As illustrated by Tables 25 to 28, Formulation 1 continued to exhibit lower phytotoxicity than the comparative liquid Fe HEDTA. Additionally, Formulation 1 demonstrated phytotoxicity levels different, but commensurate, to an existing commercial product.

Greening Response

To understand if the granular agricultural compositions described herein had the potential to enhance greening of turfgrass, several trials were conducted. The evaluated formulations, and application rates are depicted in Table 29 and included Formulation 2 (Table 1), Formulation 4 (Formulation 2 formulated with ferrous sulfate ($FeSO_4$) as a substitute (at higher iron rates) for Fe EDTA), and Formulation 5 (Formulation 2 formulated without an iron source).

TABLE 29

(Application Rates for Turfgrass Greening Evaluation)

| Formulations | N—P—K, % Fe | Formulation Application Rate | Pounds Iron/ 1000 $ft^2$ | Pounds Nitrogen/ 1000 $ft^2$ |
|---|---|---|---|---|
| Formulation 2 | 22-0-2, 3.25% | 4.092 lb/1000 $ft^2$ | 0.152 | 0.9 |
| Formulation 4 | 22-0-2, 7.5% | 4.092 lb/1000 $ft^2$ | 0.307 | 0.9 |
| Formulation 5 | 28-0-3, 0% | 3.2 lb/1000 $ft^2$ | 0.0 | 0.9 |
| Non-treated control | — | — | — | — |

All treatments were applied early in the morning to turf that was covered in dew. Mowing was withheld for 24 to 48 hours to ensure sufficient leaf area was present for formulation absorption. The experimental unit for turfgrass color response testing was a 3'×3' plot. The research area for turfgrass color response contained minimal weed pressure so that product impact could be accurately and consistently assessed. Plots were separated on each side by a 2 ft. untreated buffer strip. All treatments were applied using a shaker jar and spreader box to ensure even particle coverage over the plot. Treatments remained on the leaf surface for 24 hours prior to being watered in with 0.18" of water. Turfgrass color was rated visually using the National Turfgrass Evaluation Program color rating scale (1-9). Treatments were rated for color 1, 4, 7, and 14 days after application. Table 30 depicts testing on Kentucky bluegrass,

TABLE 30

(Kentucky Bluegrass Greening Response)

| Formulation | Turf Color (1-9) Days After Initial Application | | | |
|---|---|---|---|---|
| | 1 | 4 | 7 | 14 |
| Formulation 2 (Table 1) | 6.25 | 6.63 | 7.00 | 7.13 |
| Formulation 4 (Formulation 2 with FeSO$_4$ as the Iron Source) | 6.25 | 6.38 | 7.13 | 7.25 |
| Formulation 5 (Formulation 2 without Iron Source) | 5.63 | 6.00 | 6.50 | 6.13 |
| Non-treated Control | 5.75 | 5.38 | 5.63 | 5.13 |

To further explain the positive greening response of Formulation 2, two additional trials were conducted on Kentucky bluegrass and perennial ryegrass. The additional trials compared Formulations 2 and 5 with other commercial greening products at equivalent nitrogen rates to better understand the speed of the greening response as well as the darkness of the greening response. Application rates are described in Table 31. The commercial greening products include Green Max™ Lawn Food and Turf Builder® Lawn Food available from the Scotts Company LLC (Marysville, OH). Urea was also evaluated.

TABLE 31

(Application Rates for Turfgrass Greening Evaluation)

| Comparative Formulation | N—P—K, % Fe | Formulation Application Rate | Pounds Iron/ 1000 ft$^2$ | Pounds Nitrogen/ 1000 ft$^2$ |
|---|---|---|---|---|
| Formulation 2 | 22-0-2, 3.25% | 5.0 lb/1000 ft$^2$ | 0.16 | 1.1 |
| Formulation 5 | 28-0-3, 0% | 3.93 lb/1000 ft$^2$ | — | 1.1 |
| Green Max ™ Lawn Food | 27-0-2, 5% | 4.07 lb/1000 ft$^2$ | 0.20 | 1.1 |
| Turf Builder ® Lawn Food | 32-0-4, 2% | 3.44 lb/1000 ft$^2$ | 0.07 | 1.1 |
| Urea | 46-0-0, 0% | 2.4 lb/1000 ft$^2$ | — | 1.1 |
| Non-treated Control | — | — | — | — |

For each trial, preceding application, mowing was withheld for 24 to 48 hours to ensure sufficient leaf area was present for formulation absorption. The experimental unit for turfgrass color response testing was a 3'×3' plot. The research area for turfgrass color response contained minimal weed pressure so that product impact could be accurately and consistently assessed. Plots were separated on each side by a 2 ft. untreated buffer strip.

Formulations 2 and 5 were applied early in the morning to dew-laden turf. Green Max™ Lawn Food, Turf Builder® Lawn Food, and urea were all applied to dry turf once the morning dew had dissipated. All treatments were applied using a shaker jar and spreader box to ensure even particle coverage over the plot. Treatments applied to dry turf were watered in immediately after application with 0.18" of water and wet-foliage applied treatments remained on the leaf surface for 24 hours prior to being watered in with 0.18" of water. This trial design allowed for comparative evaluation of the response of turf to foliar nitrogen and iron compared to foliar nitrogen; soil applied nitrogen; and soil applied nitrogen and iron at two different rates of iron application. Turfgrass color was rated visually using the National Turfgrass Evaluation Program color rating scale (1-9). Treatments were rated for color 3 and 6 hours after application, and then 1, 3, 7, 14, and 20 days after application. Table 32 depicts testing of Kentucky bluegrass while Table 33 depicts testing of Perennial ryegrass.

TABLE 32

(Kentucky Bluegrass Greening)

| Formulation | Turf Color (1-9) Hours/Days After Initial Application | | | | | | |
|---|---|---|---|---|---|---|---|
| | 3 hr | 6 hr | 1 D | 3 D | 7 D | 14 D | 20 D |
| Formulation 2 | 3.88 | 4.00 | 4.63 | 4.50 | 5.13 | 6.00 | 6.88 |
| Formulation 5 | 3.75 | 3.75 | 3.88 | 3.88 | 4.50 | 5.13 | 6.13 |
| Green Max ™ Lawn Food | 4.00 | 3.88 | 3.88 | 4.00 | 4.63 | 5.25 | 6.25 |
| Turf Builder ® Lawn Food | 3.75 | 4.00 | 4.00 | 4.00 | 4.75 | 5.38 | 6.13 |
| Urea | 3.75 | 3.75 | 3.88 | 4.00 | 4.63 | 5.25 | 6.25 |
| Non-treated Control | 3.63 | 3.75 | 3.63 | 3.75 | 3.88 | 4.00 | 4.75 |

TABLE 33

(Perennial Ryegrass Greening)

| Formulation | Turf Color (1-9) Hours/Days After Initial Application | | | | | | |
|---|---|---|---|---|---|---|---|
| | 3 hr | 6 hr | 1 D | 3 D | 7 D | 14 D | 20 D |
| Formulation 2 | 3.50 | 3.75 | 4.25 | 4.25 | 5.50 | 5.75 | 6.75 |
| Formulation 5 | 3.25 | 3.50 | 3.38 | 3.13 | 4.38 | 4.63 | 6.00 |
| Green Max ™ Lawn Food | 3.13 | 3.25 | 3.63 | 3.13 | 4.75 | 5.13 | 6.25 |
| Turf Builder ® Lawn Food | 3.63 | 3.38 | 4.50 | 3.38 | 4.88 | 5.00 | 6.38 |
| Urea | 3.13 | 3.50 | 3.50 | 3.13 | 4.63 | 4.88 | 6.13 |
| Non-treated Control | 3.50 | 3.38 | 3.50 | 2.88 | 3.25 | 3.25 | 4.50 |

Greening from Formulation 2 was greater than other comparative treatments as soon as 1 day after application on Kentucky bluegrass and 6 hours after application on perennial ryegrass. Formulation 2 remained greener for the remainder of the rating dates for both species. These results were surprising because Urea—which is 100% water-soluble Nitrogen, typically causes the quickest and darkest greening response. Formulation 2, which delivered foliar nitrogen and iron from a granule, greened faster than foliar nitrogen, soil applied nitrogen, and soil-applied nitrogen and iron.

Fertilizer Substitute

Based on the surprising greening results of Formulation 2, use of the present granular agricultural compositions as a fertilizer substitute were evaluated. Specifically, Tables 34 and 35 evaluate the effect of applying Formulation 2 and GreenMax™ Lawn Food at different application rates (normalized to identical nitrogen amounts) to both Kentucky bluegrass and perennial ryegrass respectively. Other than differing in application rates, procedures and methods follow the procedures and methods described with respect to Tables 31 to 33. Greening was used to evaluate the fertilizer response.

TABLE 34

(Kentucky Bluegrass Greening)

| Formulation | App. Rate (lb/1000 ft²) | Turf Color (1-9) Hours/Days After Initial Application | | | | | | | | |
|---|---|---|---|---|---|---|---|---|---|---|
| | | 3 hr | 6 hr | 1 D | 2 D | 3 D | 7 D | 10 D | 20 D | 45 D |
| Formulation 2 | 2.0 | 3.75 | 3.75 | 4.13 | 4.13 | 4.13 | 4.63 | 4.38 | 5.88 | 4.88 |
| Formulation 2 | 3.25 | 3.88 | 4.13 | 4.50 | 4.5 | 4.25 | 5.00 | 5.00 | 6.38 | 6.00 |
| Formulation 2 | 4.0 | 3.75 | 3.88 | 4.38 | 4.5 | 4.38 | 5.00 | 4.88 | 6.50 | 6.00 |
| Formulation 2 | 5.0 | 3.63 | 3.75 | 4.50 | 4.63 | 4.50 | 4.88 | 5.38 | 7.13 | 6.13 |
| Formulation 2 | 6.25 | 3.38 | 3.75 | 4.63 | 4.63 | 4.38 | 5.13 | 5.50 | 7.25 | 6.50 |
| Green Max™ Lawn Food | 1.630 | 3.75 | 3.63 | 4.00 | 3.75 | 3.63 | 4.25 | 4.00 | 5.00 | 4.13 |
| Green Max™ Lawn Food | 2.648 | 3.88 | 3.75 | 3.88 | 3.88 | 3.88 | 4.50 | 4.38 | 5.63 | 4.50 |
| Green Max™ Lawn Food | 3.259 | 3.88 | 4.00 | 4.12 | 4.00 | 3.88 | 4.63 | 4.75 | 5.75 | 5.25 |
| Green Max™ Lawn Food | 4.074 | 3.88 | 3.88 | 4.00 | 4.13 | 3.88 | 4.63 | 4.75 | 6.00 | 5.50 |
| Green Max™ Lawn Food | 5.093 | 3.88 | 3.88 | 4.00 | 3.88 | 4.00 | 4.63 | 4.75 | 6.13 | 5.50 |
| Non-treated Control | — | 3.63 | 3.75 | 3.63 | 3.63 | 3.63 | 4.00 | 4.00 | 5.13 | 4.00 |

TABLE 35

(Perennial Ryegrass Greening)

| Formulation | App. Rate (lb/1000 ft²) | Turf Color (1-9) Hours/Days After Initial Application | | | | | | | | |
|---|---|---|---|---|---|---|---|---|---|---|
| | | 3 hr | 6 hr | 1 D | 2 D | 3 D | 7 D | 10 D | 14 D | 20 D |
| Formulation 2 | 2.0 | 4.75 | 5.00 | 4.88 | 4.75 | 4.88 | 5.00 | 5.00 | 5.00 | 6.13 |
| Formulation 2 | 3.25 | 4.38 | 4.50 | 4.50 | 4.75 | 4.38 | 4.63 | 5.00 | 5.13 | 6.00 |
| Formulation 2 | 4.0 | 4.50 | 4.63 | 4.88 | 5.00 | 4.75 | 5.38 | 5.63 | 5.75 | 6.50 |
| Formulation 2 | 5.0 | 4.50 | 4.63 | 5.00 | 5.38 | 5.25 | 5.38 | 5.75 | 6.00 | 6.88 |
| Formulation 2 | 6.25 | 4.88 | 5.00 | 5.50 | 5.50 | 5.38 | 5.88 | 6.00 | 6.50 | 7.50 |
| Green Max™ Lawn Food | 1.630 | 4.63 | 4.75 | 4.38 | 4.63 | 4.25 | 4.25 | 4.38 | 4.50 | 5.50 |
| Green Max™ Lawn Food | 2.648 | 4.75 | 4.88 | 4.63 | 4.63 | 4.38 | 4.50 | 4.75 | 4.75 | 5.88 |
| Green Max™ Lawn Food | 3.259 | 4.63 | 4.50 | 4.38 | 4.25 | 4.00 | 4.63 | 4.88 | 5.00 | 6.25 |
| Green Max™ Lawn Food | 4.074 | 4.38 | 4.63 | 4.38 | 4.25 | 4.00 | 4.75 | 4.75 | 5.38 | 6.25 |
| Green Max™ Lawn Food | 5.093 | 4.63 | 4.75 | 4.75 | 4.63 | 4.50 | 5.13 | 5.50 | 6.13 | 7.00 |
| Non-treated Control | — | 4.50 | 4.63 | 4.25 | 4.25 | 3.88 | 4.00 | 4.00 | 4.00 | 4.50 |

As depicted by Tables 34 and 35, Formulation 2 exhibits excellent results for use as a fertilizer as demonstrated by the superior greening results compared to a commercial greening product. In many instances application reduced rates of Formulation 2 performed equal to or better rates than higher rates of Green Max™ Lawn Food.

As used herein, all percentages (%) are percent by weight of the total composition, also expressed as weight/weight %, % (w/w), w/w, w/w % or simply %, unless otherwise indicated.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A granular herbicidal composition comprising:
   a metal chelate, wherein the metal chelate comprises one or more of Fe ethylenediaminetetraacetic acid ("Fe EDTA") and Fe hydroxyethylenediaminetriacetic acid ("Fe HEDTA");
   a granular carrier, wherein the granular carrier comprises granulated rice hulls; and
   a nitrogen source comprising plant readily available nitrogen.

2. The granular herbicidal composition of claim 1 comprises about 3% to about 4%, by weight, iron.

3. The granular herbicidal composition of claim 1, wherein the nitrogen source comprises a methylene urea resin product.

4. The granular herbicidal composition of claim 3, wherein the methylene urea resin product is formed with a urea to formaldehyde ratio of about 4:1 and comprises about 20% to about 24%, by weight, nitrogen.

5. The granular herbicidal composition of claim 1 has a particle size of about 70 Size Guide Number ("SGN") to about 120 SGN.

6. The granular herbicidal composition of claim 1, wherein the weight ratio of the nitrogen source to the granular carrier is about 2.40:1 to about 3.20:1.

7. The granular herbicidal composition of claim 1 comprises, by weight:
   about 15% to about 25% of the granular carrier;
   about 15% to about 30% of the metal chelate; and
   about 40% to about 72.5% of the nitrogen source.

8. The granular herbicidal composition of claim 1 further comprises a dust suppressant.

9. The granular herbicidal composition of claim 1 further comprising about 3% to about 7%, by weight, of potassium sulfate or potassium chloride.

10. A method of controlling weeds comprising applying the granular herbicidal composition of claim 1 to of plants.

11. The method of claim 10, wherein the granular herbicidal composition is applied at a rate of about 4.092 pounds per 1000 square feet.

12. The method of claim 10 wherein the granular herbicidal composition is applied at one or more of a rate of about 0.9 pounds of nitrogen per 1000 square feet and about 0.10 pounds per 1000 square feet to about 0.40 pounds per 1000 square feet of iron.

13. A method of forming a granular herbicidal composition comprising:
    mixing a metal chelate, a granular carrier, and a nitrogen source comprising plant readily available nitrogen together to form an herbicidal composition; and
    granulating the herbicidal composition to form a granulated herbicidal composition; wherein the metal chelate comprises one or more of Fe ethylenediaminetetraacetic acid ("Fe EDTA") and Fe hydroxyethylenediaminetriacetic acid ("Fe HEDTA"), and wherein the granular carrier comprises granulated rice hulls.

14. The method of claim 13, wherein the nitrogen source is a molten methylene urea resin product.

15. The method of claim 13, wherein the granular carrier comprises granulated rice hulls having a particle size of about 20 Size Guide Number ("SGN") to about 70 SGN.

16. The method of claim 13, wherein the granulated herbicidal composition is granulated to a size of about 70 SGN to about 120 SGN.

* * * * *